A. J. FORBES.
FASTENING FOR DRIVING BELTS.
APPLICATION FILED FEB. 9, 1921.

1,422,430.

Patented July 11, 1922.

Inventor
Alexander J. Forbes
By Knight Bros
Attys

UNITED STATES PATENT OFFICE.

ALEXANDER JOHN FORBES, OF BROOKLEA, NORTH KESSOCK, SCOTLAND.

FASTENING FOR DRIVING BELTS.

1,422,430.             Specification of Letters Patent.       Patented July 11, 1922.

Application filed February 9, 1921. Serial No. 443,648.

*To all whom it may concern:*

Be it known that I, ALEXANDER JOHN FORBES, British subject, residing at Brooklea, North Kessock, by Inverness, Scotland, have invented a new and useful Improvement in Fastenings for Driving Belts (for which I have filed application in England June 19, 1916, No. 17,746), of which the following is a specification.

This invention relates to an adjustable screw fastening for driving belts and is particularly applicable to the driving belts of motor cycles.

In such fastenings it has been heretofore proposed to provide right and left hand coupling screws and a short sleeve piece or block or the like of the same cross sectional figure as the driving belt so as to engage the pulley grooves such sleeve piece or block having a central pivot pin for the attachment of the right and left hand screws, or having a through-and-through socket hole for the screws.

Under the present invention an ordinary belt is divided into two parts preferably of unequal length, the ends of the belt parts being connected by means of two separate fastenings one of which has a right and the other a left hand coupling screw, the shorter portion of the belt being rotated—without the aid of any tool—to shorten or lengthen the belt.

The fastenings are made with right and left hand screw bolts or members which may be provided with crossheads having bearing rollers thereon, and adapted to engage and work in suitable bearing brackets permanently attached to the belt.

In order that this invention may be clearly understood I have hereunto appended an explanatory drawing showing by way of example one form of the fastening.

Figure 1:
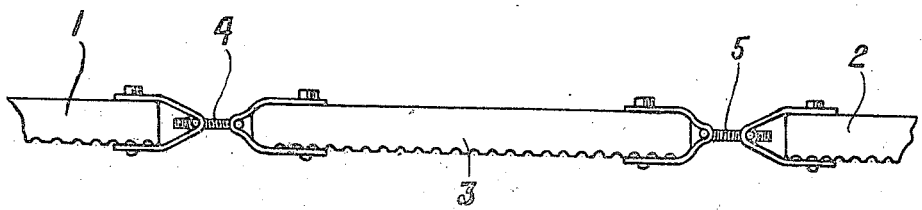
Fig. 1 is a side view of the fastening.
Figure 2:
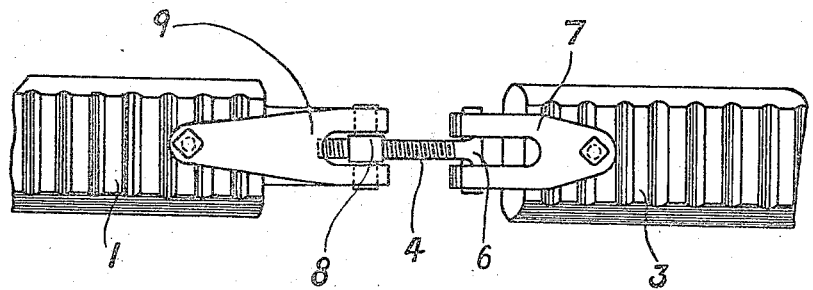
Fig. 2 is a view of one part of the fastening looking on the inner or bearing face of the belt.

In the form shown the ends 1, 2 of the belt have a short belt piece 3 between them, the parts, 1—3 being connected by a right hand screw pin 4 whilst the parts 3, 2 are connected by a left hand screw pin 5 so that distance between the ends 1, 2 may be reduced or increased by simply rotating the piece 3. Each of the screw pins 4, 5 is made with a crosshead 6 which engages a strap or U piece 7 secured to the end of the piece 3 and each of such pins engages a screw threaded socket in a cross bar or the like 8 which latter engages a strap or U piece 9 secured on the belt end 1 or 2.

Claim:

In a driving belt, an adjustable fastening comprising a flexible belt section of substantial length and of substantially the same cross-sectional figure as the driving belt, a pivoted left-hand screw coupling between one end of said flexible section and the belt, and a pivoted right-hand screw coupling between the belt and the other end of said flexible section, each coupling comprising a slotted clip secured to one end of the flexible belt section, a screw pivoted to said clip and movable in said slot, a second slotted clip secured to the belt, said screw passing freely through the slot of said second clip and an adjustable crosshead on said screw, said crosshead being embraced by said second clip so that the pair of clips are movable towards each other but restrained from movement in the opposite direction.

ALEXANDER JOHN FORBES.